2 Sheets—Sheet 1.
H. SANCHE.
ELECTRICAL CONNECTION.
No. 11,397. Reissued Jan. 2, 1894.
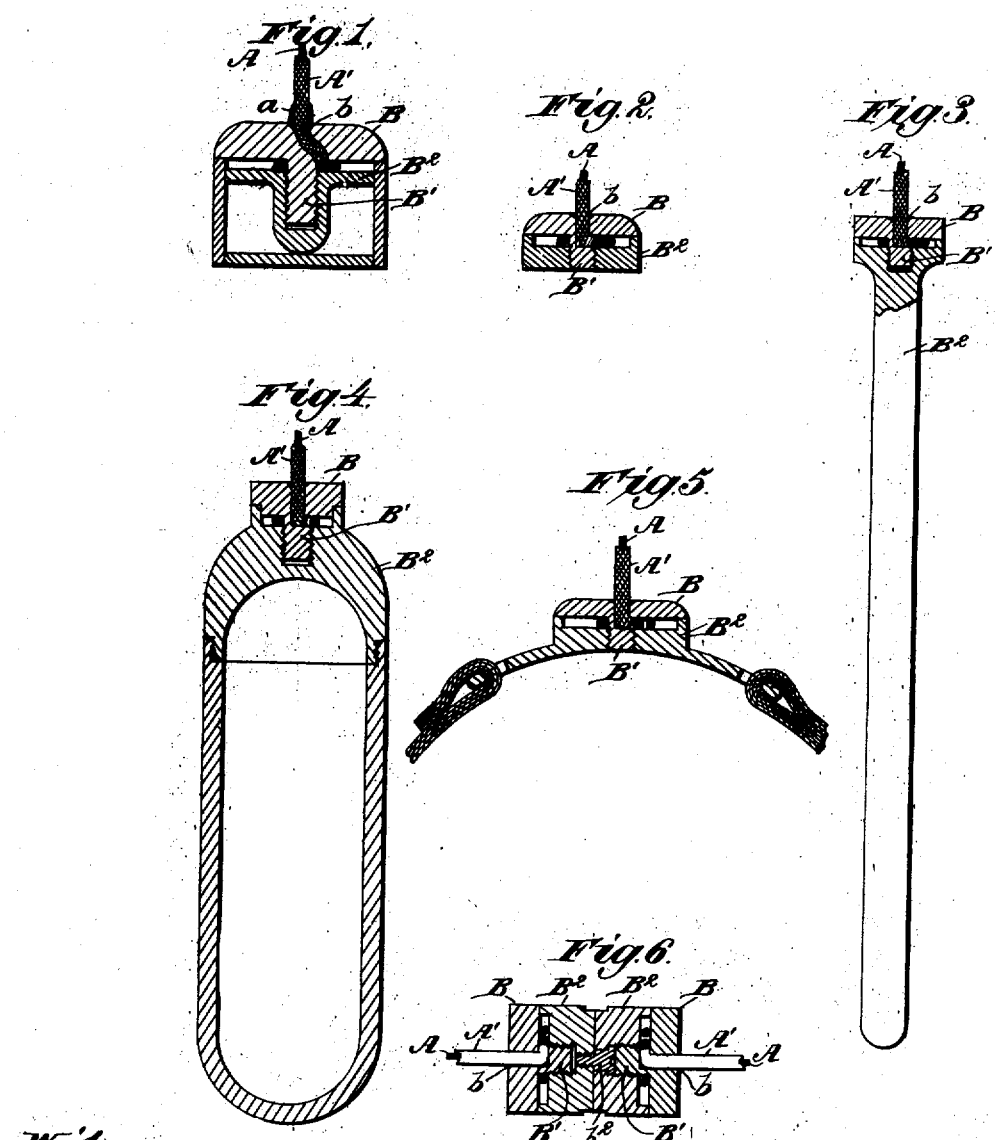
Witnesses:
Robert Everett
William Gaskin
Inventor
Hercules Sanche.
By James L. Norris
Atty.

2 Sheets—Sheet 2.

H. SANCHE.

ELECTRICAL CONNECTION.

No. 11,397. Reissued Jan. 2, 1894.

Witnesses.
Robert Everett,
William Gaskin

Inventor:
Hercules Sanche,
By James L. Norris.
Atty.

UNITED STATES PATENT OFFICE.

HERCULES SANCHE, OF DETROIT, MICHIGAN.

ELECTRICAL CONNECTION.

SPECIFICATION forming part of Reissued Letters Patent No. 11,397, dated January 2, 1894.

Original No. 430,974, dated June 24, 1890. Application for reissue filed June 20, 1892. Serial No. 437,433.

*To all whom it may concern:*

Be it known that I, HERCULES SANCHE, a citizen of the United States, residing at Detroit, county of Wayne, State of Michigan, have invented a certain new and useful Improvement in Electrical Connections; and I declare the following to be a full, clear, and exact description of the invention, such as will enable others skilled in the art to which it pertains to make and use the same, reference being had to the accompanying drawings, which form a part of this specification.

Figure 8:
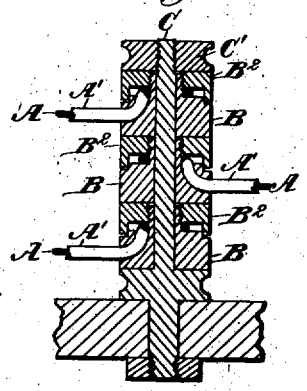
Figure 9:
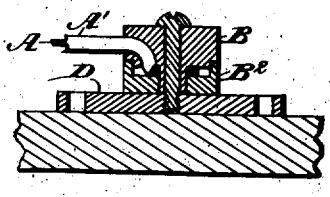
Figure 7:
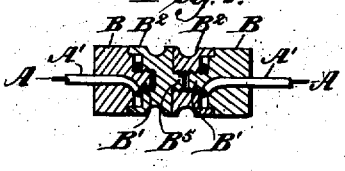
Figure 10:
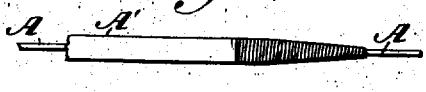
Figure 11:
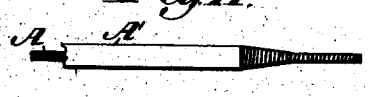
Figure 12:
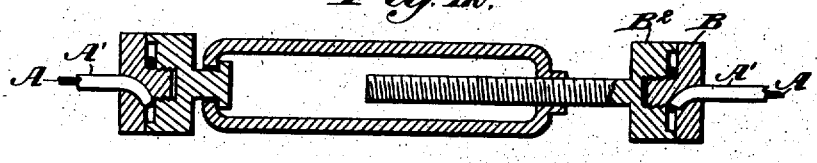

In the drawings, Figure 1 shows my invention applied as a binder or connection to an ordinary pole-piece, said pole-piece being in the nature of a block or hand-piece with the extreme end closed and with the entering cable shellacked about the point of entrance to preserve the fabric or covering of the wire from the effects of moisture. Fig. 2 shows a similar construction, except that the extreme end is opened. Fig. 3 shows its use in connection with a long pole-piece. Fig. 4 illustrates the same in connection with a pole-piece which is itself charged upon its interior with filling material. Fig. 5 illustrates the same appliance in connection with a pad such as may be employed in belts or bracelets designed for use in connection with an electric current led to it by a line. Fig. 6 shows how it may be used for uniting two meeting ends of stiff wire and avoid the necessity of twisting the wire, there being a screw-threaded swivel interposed between the terminals at the ends of the wire, so that by turning the parts of the swivel in opposite directions each part may be screwed to its adjacent terminal without twisting the wire. Fig. 7 shows its application as a terminal for the meeting ends of flexible wires, where they may be twisted slightly without injury to them. Fig. 8 shows the same adapted for the binding-post of any electrical instrument and adapted to accommodate several wires. Fig. 9 shows the same, illustrating how it may be connected with a plate, and the latter in turn connected to an electrical instrument and constituting a binding-post. Fig. 10 is a view illustrating how the cable covering or fabric is united to the cable at the point where the fabric is severed so as to prevent its unraveling, the same being shown in connection with stiff wire. Fig. 11 is a similar view showing the same in connection with a flexible wire cable and illustrating how the fine wires of the cable are beyond the fabric wrapped with wire to bunch and confine them and to make them sufficiently stiff for convenient use at the binding-posts. Fig. 12 shows the swivel connection with the swivel in the form of a turnbuckle, whereby any slack in a taut wire may be taken up without twisting the wire.

Heretofore the fastenings whereby wires or tensile cords, over which electric currents are passed, are connected to the various forms of binding-posts or to various forms of apparatus have always been a source of great annoyance to persons using electrical machines. Thus where stiff wires are employed—such as are used in the telephone service or in the various applications of electricity for burglar-alarms, medical instruments of various kinds, and the like—the ends are very apt to project and are unsightly and liable to catch upon the fingers or the clothes. Again, each time the circuit is broken the wire has to be unwound or untwisted, and is thereby generally injured or broken. Again, where a cable is employed composed of fine wires—as, for instance, like those connected with the pole-pieces or hand-holds in the various instruments used by the medical profession, or for connecting the ear-pieces of telephones to the telephone-box, and the like—the silk or worsted or other fabric with which the wire is wound or insulated has to be cut away to bare the terminal end of the cable wires. They are thus loose, and they rapidly unravel and become unsightly and do not serve to afford the cable the necessary insulation and strength at the point of union. Again, the small wires themselves become tangled and disarranged and are exceedingly annoying to handle, not only by reason of pricking the fingers, but because they are not sufficiently stiff to hold in the binding-post.

It is the purpose of my invention to produce a terminal adapted for connection to a binding-post, or serving directly as a binding post in connection with the object to which it is to be attached, the said terminal remaining always on the end of the wire to be connected, and to provide in connection therewith and for use therewith or without this peculiar terminal a means for preventing the unraveling of the winding or insulation upon the wire or cable and for stiffening and strengthening the free ends of the fine wires in flexible wire cables.

To this end A represents a wire. A′ is its insulation winding of silk, worsted, or fabric. B is a terminal designed for permanent connection with the end of the insulated wire.

B′ is a screw-shank, and *b* is an orifice through which the wire is passed, so that its free end may be wound about this shank.

$B^2$ is a companion piece into which the shank B′ is screwed. Either the terminal B or the companion piece $B^2$ is hollowed out sufficiently that when one is screwed down upon the other the end of the wire is completely housed and hidden from view. By winding or coiling the wire A around the shank B′, as shown, it is made to expose a larger surface to the companion piece $B^2$. This companion piece in Fig. 1 is simply a knob, which, together with the terminal B, constitutes a pole-piece with its extreme end closed. In Fig. 2 there is precisely the same construction, except that the screw shank passes into an orifice which extends through the block or companion piece. In Fig. 3 there is a like construction, in which the terminal B is engaged with a long-pole-piece or companion part $B^2$. In Fig. 4 there is a similar construction, in which the companion piece $B^2$ is itself a pole-piece, but is made hollow for the purpose of receiving a charge of exciting or other material upon its interior. In Fig. 5 the same is shown as applied to the pad of an electric belt or bracelet designed to be worn upon the surface of some part of the body, the companion piece being made permanent with the pad, or the base to which the pad is attached. In Fig. 6 there is a similar construction designed for uniting the two meeting ends of the wire, the companion piece in this instance being two central portions $B^2 B^2$ swiveled together at $b^2$. This form is particularly convenient, since it enables a union to be made of the two meeting ends without twisting either end, it being only necessary to turn either of the swivels $B^2$ in order to engage its thread socket with the thread-shank B′ of its adjacent terminal. This same connection (shown in Fig. 6) is also of great value for connecting two ends of the wire where the wire is apt to be twisted, for any tendency to twist the wire will simply cause the connection to turn about its swivel freely. This connection for the two ends of the wire may be made either with the swivel or without the swivel. Thus, as shown in Fig. 7, each terminal has its own companion piece screwed thereto, while on one of the companion-pieces is a screw-shank $B^3$, adapted to enter a corresponding screw-socket in the companion piece of the adjacent terminal.

This invention is equally applicable for the permanent or stationary binding-posts upon the various forms of electrical machines and apparatus. Thus, as shown in Fig. 8, each wire has its own terminal and companion piece, and when it is desired to connect it with the binding-post C it is only necessary to drop it over the end of the binding post and screw down the jam-nut C′ upon it. It is equally well adapted for connection to a plate D, as shown in Fig. 9, in which event the terminal may be bound to a plate, either as shown in Fig. 8, or by a screw passed down through the top into the plate, as shown in Fig. 9. Of course the form of the device may be somewhat varied.

In order to prevent the insulation winding from unraveling at the point where the wire is bared, I wrap the same with fine wire, as shown in Fig. 10. This binds the fag ends of the fabric or winding firmly to the wire, so that it is made perfectly secure at this point. This drawing, Fig. 10, shows the said construction in connection with a single stiff strand of wire; but in Fig. 11 it is shown as applied to the fine wires at the end of the flexible wire cable. In this latter case I carry the winding along to the end of the said fine wire strands, not only to hold them together, but also by thus bunching them to make this bared end of wire sufficiently stiff in the nature of a thick strand of wire to hold its own within the binder or terminal. I would have it understood that this arrangement of the ends of the wires or wire cables is particularly applicable in the devices which are hereinbefore described; but I would not limit myself to their use in connection with said devices, for they are equally applicable and valuable in connection with any form of binding-post or fastening. Wherever it is necessary or desirable, the wire cable may, as shown at *a* in Fig. 1, be treated with shellac at the point where it enters the fastening or terminal piece to protect it against the effects of moisture.

If desired, the form of the swivel-connection shown in Fig. 6 may be varied, as shown in Fig. 12, this latter construction being adapted for taking up any slack in a wire which is desired to be perfectly taut without twisting the wire, since the ends of the wire may be engaged to the two end pieces and these latter drawn together by the turn buckle swiveled to one end piece and the screw attached to the other.

What I claim is—

1. The combination of the perforated terminal piece B, provided with the shank B′, the companion piece $B^2$, engaged with said shank, and the wire or cable A, passed through the perforation in the terminal piece and coiled around its shank, substantially as shown and described.

2. The combination, with the meeting ends of wires or wire cables, of a terminal piece and companion piece on the end of each wire, shanks connecting each terminal to its companion piece, the ends of the wires being coiled around said shanks, and a connection between the two companion pieces, substantially as described.

3. A connection for the meeting ends of wires or wire cables, the same consisting of a terminal piece for each wire, through which the wire is passed, and two companion pieces swiveled together, each said companion piece provided with a screw engagement whereby it is united with its corresponding terminal piece, substantially as and for the purposes described.

In testimony whereof I have hereunto set my hand in the presence of the subscribing witnesses.

HERCULES SANCHE.

Witnesses:
EWELL A. DICK,
JAMES L. NORRIS.